United States Patent [19]
Edwards

[11] Patent Number: 6,116,676
[45] Date of Patent: Sep. 12, 2000

[54] FOLDING TAILGATE SEAT

[76] Inventor: Michael S. Edwards, 1016 Whipporwill Dr., Port Orange, Fla. 32127

[21] Appl. No.: 09/397,902

[22] Filed: Sep. 17, 1999

[51] Int. Cl.[7] .............................. B60N 2/00; B60N 2/02; A47C 15/00; A47D 1/10
[52] U.S. Cl. ................... 296/64; 296/65.05; 296/65.09; 296/65.16; 297/352
[58] Field of Search ................... 296/64, 65.05, 296/65.09, 65.16; 297/252, 255, 256, 352, 363, 365

[56] References Cited

U.S. PATENT DOCUMENTS

| | | | |
|---|---|---|---|
| 1,161,420 | 11/1915 | Snelling . | |
| 1,889,679 | 11/1932 | Martin | 296/65 |
| 3,120,404 | 2/1964 | Bramming | 297/118 |
| 3,188,133 | 6/1965 | Tewksbury | 296/65 |
| 3,366,412 | 1/1968 | Noble | 296/64 |
| 3,522,970 | 8/1970 | Francis | 297/335 |
| 3,552,788 | 1/1971 | Christensen | 296/64 |
| 3,594,039 | 7/1971 | Harp | 297/252 |
| 4,611,852 | 9/1986 | Filer | 297/352 |
| 4,679,840 | 7/1987 | Fry et al. | 296/64 |
| 4,781,413 | 11/1988 | Shumack, Jr. | 297/252 |
| 5,000,504 | 3/1991 | Munguia | 296/65.1 |
| 5,078,443 | 1/1992 | Austin | 296/63 |
| 5,215,346 | 6/1993 | Reitzloff et al. | 296/51 |
| 5,462,334 | 10/1995 | Sedorcek et al. | 297/252 |
| 5,501,501 | 3/1996 | White et al. | 296/64 |
| 5,516,179 | 5/1996 | Tidwell | 296/63 |
| 5,580,130 | 12/1996 | Wiliams et al. | 297/352 |

*Primary Examiner*—D. Glenn Dayoan
*Assistant Examiner*—Greg Blankenship
*Attorney, Agent, or Firm*—Edward M. Livingston, Esq.

[57] ABSTRACT

A folding tailgate seat has a seat (1) and a back support (2) that are foldable to parallel verticality for non-use positioning and unfoldable on a seat hinge (3) to position the seat selectively horizontal and the back support selectively vertical for seating use. At least one non-marring contractional hook (4) is fixable with preferably interchangeability to either a bottom (5) of the seat for a seat-attachment mode or to a back (6) of the back support for a back-attachment mode. In the seat-attachment mode, the non-marring contractional hook is fixable to a horizontally positional vehicle wall such as a tailgate (7) of a pickup truck or of a sports utility vehicle in a lowered horizontal attitude for use of the seat or in a raised vertical attitude of the tailgate for non-use of the seat. In the back-attachment mode, the non-marring contractional hook is fixable to a vertical vehicle wall such a back wall (8) of a trunk of a car with a trunk lid open, to a back of a raised tailgate or to a bumper of a motor vehicle. The seat and back of the seat can be cushioned and provided with trays (28), drink holders (29) and cabinets (30).

16 Claims, 3 Drawing Sheets

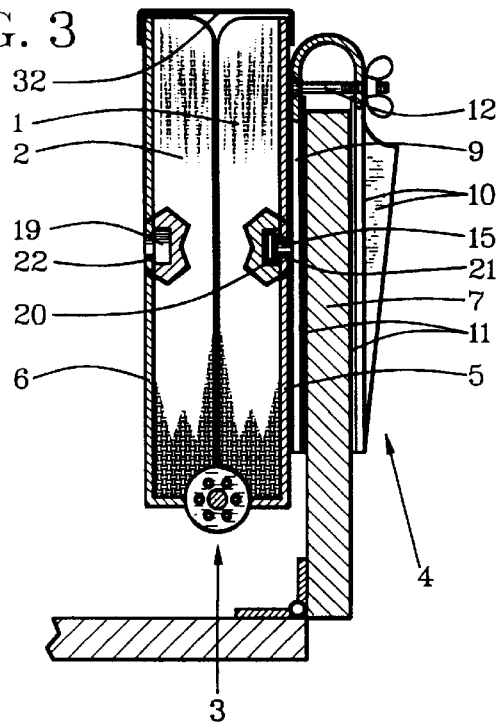
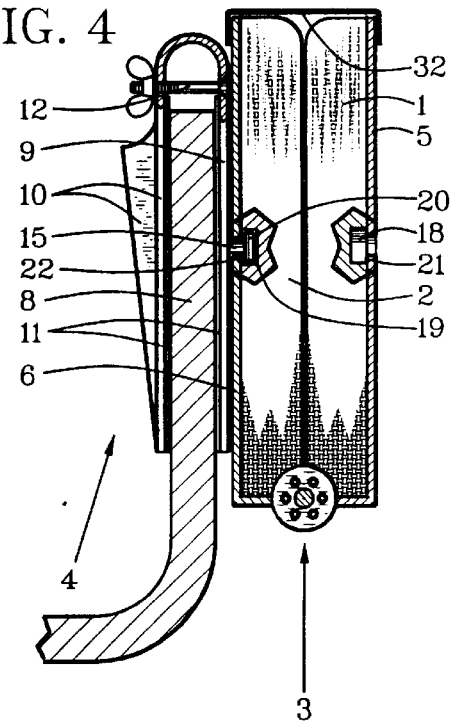
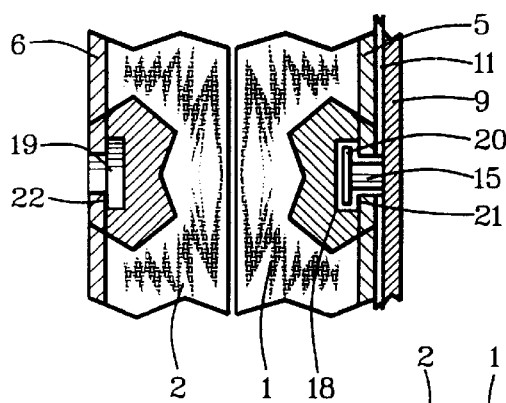
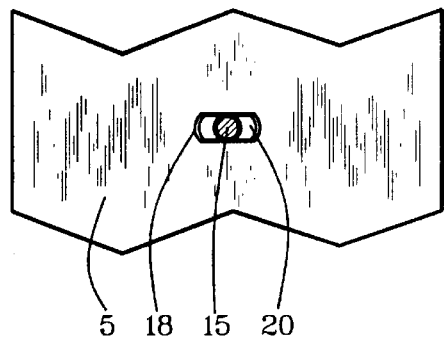
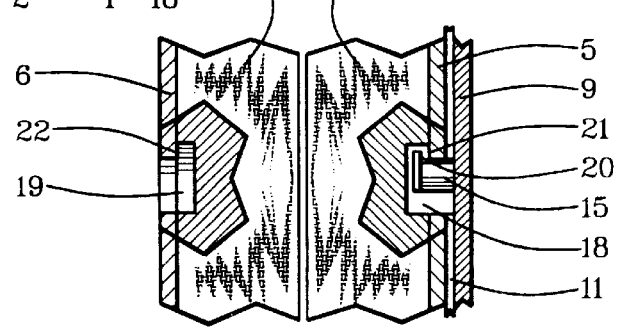

FOLDING TAILGATE SEAT

BACKGROUND OF THE INVENTION

This invention relates to seats for tailgates of pickup trucks, sports utility vehicles and similar vehicles.

There are known tailgate seats but none with the comfort, convenience, and reliability made possible by this invention. Examples of related but different tailgate seats are described in the following patent documents. U.S. Pat. No. 5,000,504, issued to Munguia on Mar. 19, 1991, describes a swivel seat attachable to a truck tailgate with a U-shaped bracket having a track on which the swivel seat is slidable to position it aft of a lowered tailgate. U.S. Pat. No. 5,462,334, issued to Sedorcek, et al. on Oct. 31, 1995, describes a seat with a back that clamps onto a top of an upright side of an open trunk of a car or onto a top edge of an upright closed tailgate of a pickup truck.

In addition, a variety of known bleacher seats are related but not pertinent to this invention.

SUMMARY OF THE INVENTION

Objects of patentable novelty and utility taught by this invention are to provide a folding tailgate seat which:

- can be used on lowered pickup tailgates, on raised pickup tailgates, on backs of sports utility vehicles or on backs of cars;
- can be attached to vehicles quickly and easily;
- can be attached permanently or temporarily;
- does not scratch or mar vehicle surfaces;
- has selectively soft cushioning; and
- has optional trays, coolers, and storage compartments.

This invention accomplishes these and other objectives with at least one folding tailgate seat having a seat and a back support that are foldable to parallel verticality for non-use positioning and unfoldable on a seat hinge to position the seat selectively horizontal and the back support selectively vertical for seating use. At least one non-marring contractional hook is fixably interchangeable to either a bottom of the seat for a seat-attachment mode or to a back of the back support for a back-attachment mode. In the seat-attachment mode, the non-marring contractional hook is fixable to a horizontally positional vehicle wall such as a tailgate of a pickup truck or of a sports utility vehicle in a lowered horizontal attitude for use of the seat or in a raised vertical attitude of the tailgate for non-use of the seat. In the back-attachment mode, the non-marring contractional hook is fixable to a vertical vehicle wall such as a back wall of a trunk of a car with a trunk lid open, to a back of a raised tailgate or to a bumper of a motor vehicle. The seat and back of the seat can be cushioned and provided with side trays, cup holders, coolers and cabinets.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 3 is a partially cutaway side view of the folding tailgate seat in folded mode attached to a top wall of a vertically oriented horizontal vehicle member such as a raised tailgate of a pickup truck;

FIG. 4 is a partially cutaway side view of the folding tailgate seat in folded mode attached to an outside wall of a vertical vehicle member such as a back of a car trunk;

FIG. 5 is a partially cutaway side view of an attachment projection having a flat retainer head in attachment portions of the folding tailgate seat;

FIG. 6 is a partially cutaway face view of an attachment bay and flat retainer head for the FIG. 5 illustration;

FIG. 7 is a partially cutaway side view of an attachment projection having a hanger head in attachment portions of the folding tailgate seat;

DESCRIPTION OF PREFERRED EMBODIMENT

Figure 1:
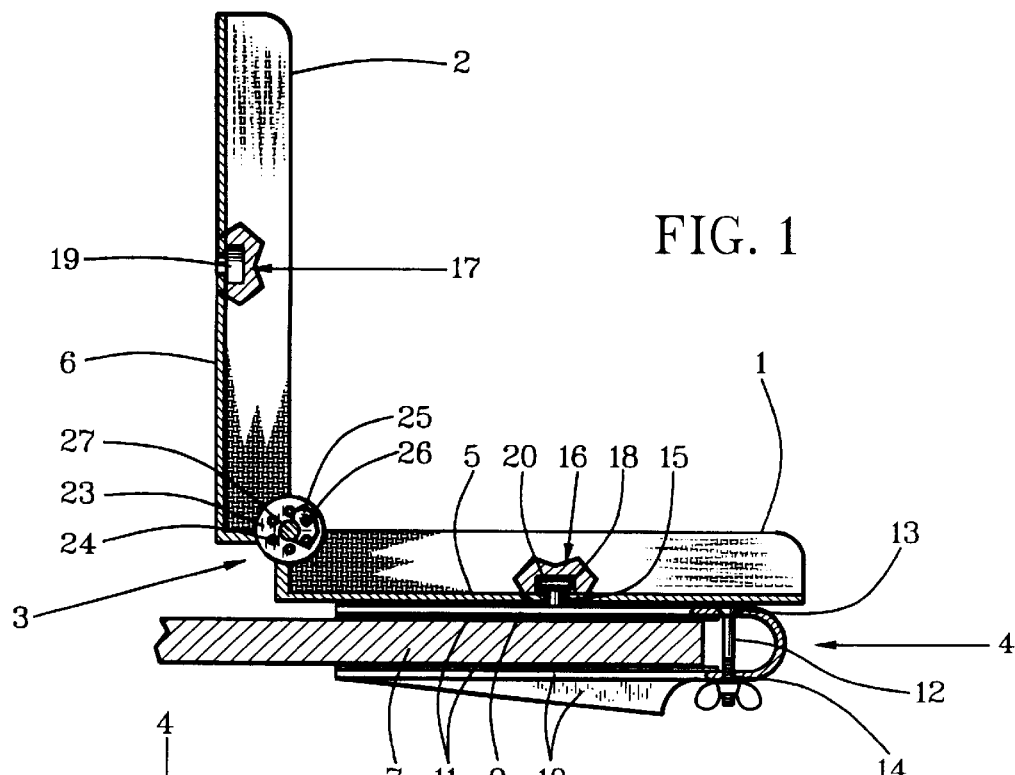
FIG. 1 is a partially cutaway side view of the folding tailgate seat in unfolded mode attached to a horizontal vehicle member such as a lowered tailgate of a pickup truck or sports utility vehicle.

Listed numerically below with reference to the drawings are terms used to describe features of this invention. These terms and list numbers assigned to them designate the same features throughout this description.

| | |
|---|---|
| 1. | Seat |
| 2. | Back support |
| 3. | Seat hinge |
| 4. | Non-marring contractional hook |
| 5. | Bottom of seat |
| 6. | Back of back support |
| 7. | Tailgate |
| 8. | Back wall |
| 9. | First leg |
| 10. | Second leg |
| 11. | Non-marring cushioning |
| 12. | Bolt |
| 13. | First orifice |
| 14. | Second orifice |
| 15. | Attachment member |
| 16. | First retainer |
| 17. | Second retainer |
| 18. | First attachment bay |
| 19. | Second attachment bay |
| 20. | Projection extension |
| 21. | First inside wall |
| 22. | Second inside wall |
| 23. | First hinge plate |
| 24. | First indexing members |
| 25. | Second hinge plate |
| 26. | Second indexing members |
| 27. | Pivot axle |
| 28. | Tray |
| 29. | Drink holder |

| | | |
|---|---|---|
| 30. | Cabinet | |
| 31. | Closures | |
| 32. | Lock strap | |

Reference is made first to FIGS. 1–4. The folding tailgate seat assembly has a seat, or seat portion, 1 and a back support 2 that are joined pivotally by a seat hinge 3 with which the seat 1 and the back support 2 are foldable to parallel verticality for non-use positioning as shown in FIGS. 3–4 and unfoldable to horizontality of the seat 1 and verticality of the seat back 2 for use as shown in FIGS. 1–2 and 8–9. A non-marring contractional hook 4 is fixable, preferably but not necessarily with interchangeability, to either a bottom 5 of the seat 1 for a seat-attachment mode or to a back 6 of the back support 2 for a back-attachment mode.

Figure 2:
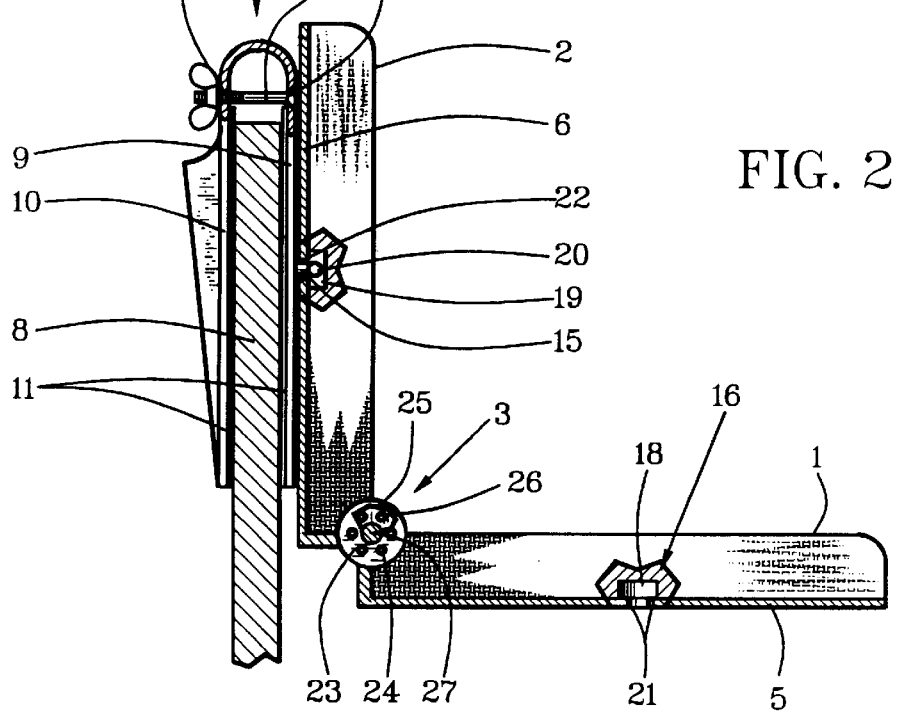
FIG. 2 is a partially cutaway side view of the folding tailgate seat in unfolded mode attached to a vertical vehicle member such as a back of a car trunk with a lid open or a raised tailgate of a pickup truck.
Figure 8:
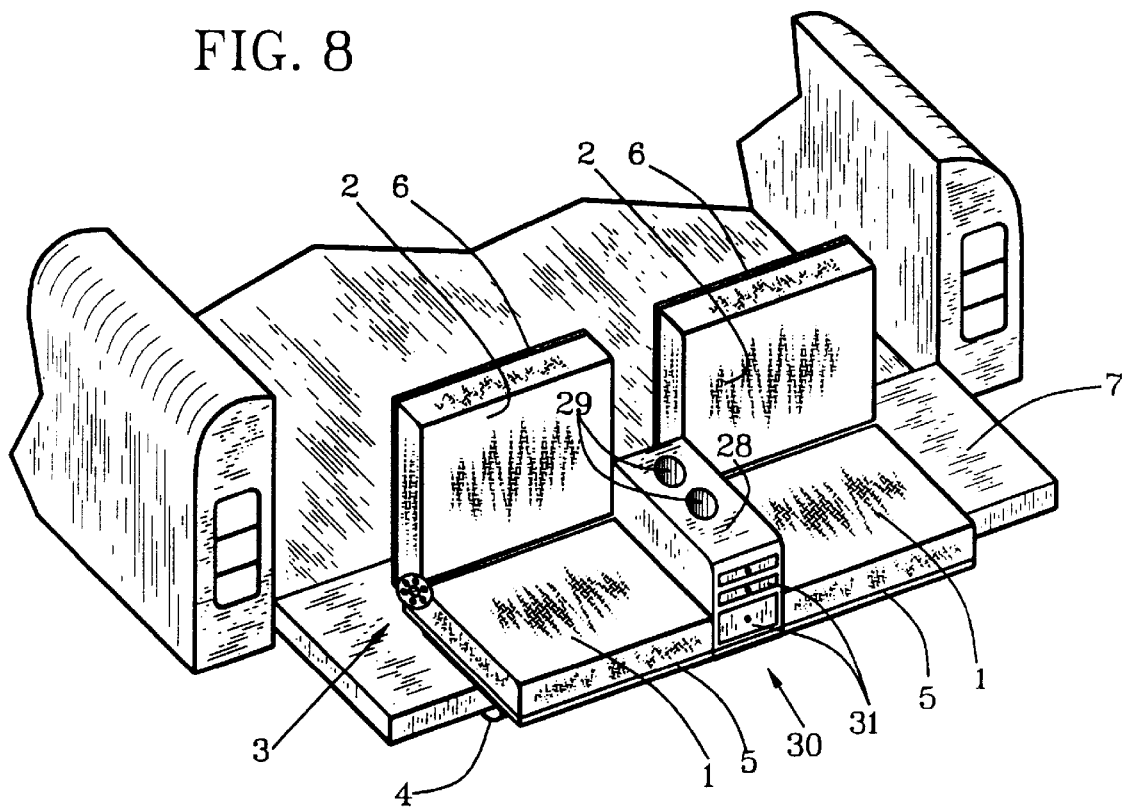
FIG. 8 is a perspective view of the folding tailgate seat attached to a lowered tailgate of a pickup truck.
Figure 9:
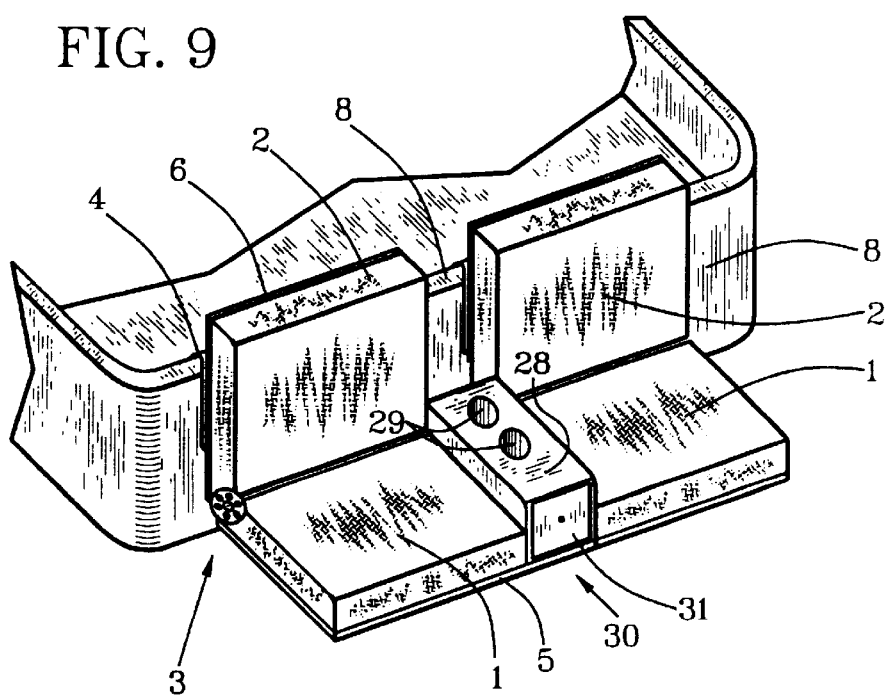
FIG. 9 is a perspective view of the folding tailgate seat attached to a vertical wall such as a rear wall of a trunk of a motor vehicle.

The non-marring contractional hook 4 is adjustable to attach snugly to oppositely disposed sides of a predetermined vehicle wall such as a pickup tailgate 7 depicted in FIGS. 1, 3 and 8 or to a back wall 8 of a car trunk or other vertical wall as depicted in FIGS. 2, 4 and 9. The non-marring contractional hook 4 can have closing-tensioned resilience proximate a bifurcation of a first leg 9 and a second leg 10 that have non-marring cushioning 11, such as a rubberlike coating, to prevent marring or scratching of vehicle surfaces to which it is attached. For particular vehicle structure, the non-marring cushioning 11 can be as thick or thin as appropriate and can be one or a plurality of cushioning members.

Adjustability of the non-marring contractional hook 4 can be spring tensioned as represented by an arcuate bifurcation intermediate the first leg 9 and the second leg 10. For adjusting nearness of the first leg 9 and the second leg 10 of the non-marring contractional hook 4, a tensioner such as a machine-threaded bolt 12 intermediate a first orifice 13 in the first leg 9 and a second orifice 14 in the second leg 10 can be employed. A non-marring contractional hook 4 that is bifurcated at an arcuate spring as depicted is represented of other non-marring contractional hooks 4 that can be used.

For interchangeability between attachment of the non-marring contractional hook 4 to the bottom 5 of the seat 1 and the back 6 of the back support 2, an attachment member 15 is affixed to the first leg 9 of the non-marring contractional hook 4 for being retained by either a first retainer 16 on the bottom 5 of the seat 1 or by a second retainer 17 on the back 6 of the back support 2. The attachment member 15 is inserted into either a first attachment bay 18 of the first retainer 16 or into a second attachment bay 19 of the second retainer 17. In an interlocking relationship, the first retainer 16 can have a first-retainer interlock, the second retainer 17 can have a second-retainer interlock and the attachment member 15 can have a projection interlock. The interlocking relationship can include at least one projection extension 20 on the attachment member 15 that buttresses or seats against a first inside wall, or first interlock, 21 of the first attachment bay 18 or a second inside wall, or second interlock, 22 of the second attachment bay 19.

The projection extension 20 can be round or arcuate as depicted in FIGS. 14, flat as depicted in FIGS. 5–6 or a one-sided hanger hook as depicted in FIG. 7. Optionally, machine threading, part-rotation threading and other interlocking devices can be employed for attachment of the non-marring contractional hook 4 to the bottom 5 of the seat 1 and/or to the back 6 of the seat back 2.

The seat hinge 3 has a pivot controller with which an unfold angle between the seat 1 and the back support 2 is fixable controllably. As depicted in FIGS. 1–2, the preferred pivot controller includes a first hinge plate 23 having first indexing members 24 and a second hinge plate 25 having second indexing members 26 that interlock with the first indexing members 24 when the first hinge plate 23 and the seat 1 which is attached to the first hinge plate 23 have been rotated on a pivot axle 27 to a desired folding or unfolding angle in relation to the second hinge plate 25 and the back support 2 which is attached to the second hinge plate 25.

The first indexing members 24 can be indexing orifices through which a lock bolt is inserted to indexing orifices in the second indexing members 26. Optionally, the first indexing members 24 and the second indexing members 26 can be matching projections and bays or ridges and channels respectively.

Referring to FIGS. 1–2 and 8–9, the at least one seat 1 and back support 2 can be a plurality of matching seats 1 and back supports 2 that can have relatively thick cushioning as shown or can be contoured like bucket seats with less cushioning. At least one tray 28 with one or more optional drink holders 29 and an optional cabinet 30 with closures 31 can be attachable to the folding tailgate seat as shown in FIGS. 8–9.

As shown in FIGS. 3–4, a lock strap 32 can be attached to the seat 1 and to the back support 2 for holding the folding tailgate seat in a folded mode when not in use.

A new and useful folding tailgate seat having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A folding tailgate seat assembly comprising:

at least one seat portion and at least one back support that are joined pivotally by a seat hinge with which the at least one seat portion and the at least one back support are foldable to parallel verticality for storage and unfoldable to horizontality of the at least one seat portion and verticality of the at least one back support for use;

at least one contractional hook that is fixably interchangeable to either a bottom of the at least one seat portion for a seat-attachment mode or to a back of the at least one back support for a back-attachment mode; and the at least one contractional hook being adjustable to attach snugly to oppositely disposed sides of a predetermined motor-vehicle wall.

2. A folding tailgate seat assembly as described in claim 1 wherein:

the contractional hook is adjustable with closing-tensioned resilience proximate a bifurcation of a first leg and a second leg of the non-marring contractional hook.

3. A folding tailgate seat assembly as described in claim 2 wherein:

nearness of the first leg and the second leg of the contractional hook is adjustable with at least one tensioner intermediate the first leg and the second leg of the contractional hook.

4. A folding tailgate seat assembly as described in claim 1 wherein:

the at least one contractional hook includes a first leg and a second leg having first and second orifices, respectively;

nearness of the first and second legs of the at least one contractional hook is adjustable with at least one machine-threaded bolt extending through the first and second orifices of the at least one contractional hook.

5. A folding tailgate seat assembly as described in claim 1 and further comprising:

cushioning on inside surfaces of the first leg and the second leg of the contractional hook.

6. A folding tailgate seat assembly as described in claim 1 wherein:

the bottom of the at least one seat has at least one first retainer for retaining an attachment member that is affixed to a first leg of the at least one contractional hook; and the back of the at least one back support has at least one second retainer for retaining the attachment member.

7. A folding tailgate seat assembly as described in claim 6 wherein:

the attachment member is interchangeable between attachment to the first retainer and the at least one second retainer.

8. A folding tailgate seat assembly as described in claim 7 wherein:

the attachment member has a projection extension with which the attachment member is attachable to the first retainer or to the second retainer;

the first retainer has a first attachment bay into which the projection extension is insertable for attachment of the attachment member to the first retainer; and the second retainer has a second attachment bay into which the projection extension is insertable for attachment of the attachment member to the second retainer.

9. A folding tailgate seat assembly as described in claim 8 wherein:

the first retainer has a first-retainer interlock;

the second retainer has a second-retainer interlock; and the projection extension comprises a a projection interlock that interlockably interchangeable with the first-retainer interlock and the second-retainer interlock.

10. A folding tailgate seat assembly as described in claim 1 wherein:

the seat hinge has a pivot controller with which an unfold angle between the at least one seat portion and the at least one back support is fixably controlable.

11. A folding tailgate seat assembly as described in claim 1 wherein:

the at least one seat portion and at least one back support are a plurality of matching seats and back supports that are sized and shaped to fit the predetermined motor-vehicle wall.

12. A folding tailgate seat assembly as described in claim 1 and further comprising:

cushioning on the at least one seat and the at least one back support.

13. A folding tailgate seat assembly as described in claim 1 and further comprising:

at least one tray is attachable to the folding tailgate seat assembly.

14. A folding tailgate seat assembly as described in claim 1 and further comprising:

at least one drink holder is attachable to the folding tailgate seat assembly.

15. A folding tailgate seat assembly as described in claim 1 and further comprising:

at least one cabinet is attachable to the folding tailgate seat assembly.

16. A folding tailgate seat assembly as described in claim 1 and further comprising:

at least one lock strap is attachable to the at least one seat and to the at least one back support for holding the folding tailgate seat assembly in a folded mode when not in use.

* * * * *